United States Patent [19]

Myers

[11] Patent Number: 5,157,585
[45] Date of Patent: Oct. 20, 1992

[54] COMPACT AC-POWERABLE PORTABLE COMPUTER HAVING A CPU AND EXPANSION BAY IN AN UPPER HOUSING PIVOTALLY ATTACHED TO A LOWER HOUSING

[75] Inventor: Stephen M. Myers, Spring, Tex.

[73] Assignee: Compaq Computer Corporation, Houston, Tex.

[21] Appl. No.: 722,526

[22] Filed: Jun. 27, 1991

[51] Int. Cl.⁵ .................. H05K 5/02; G06F 1/00
[52] U.S. Cl. .................. 361/380; 361/390; 361/393; 361/399
[58] Field of Search .......... 248/346, 919, 922, 923; 364/708; 361/380, 390, 391, 392, 393, 394, 395, 399

[56] References Cited

U.S. PATENT DOCUMENTS

| | | | |
|---|---|---|---|
| 4,575,033 | 3/1986 | Henneberg et al. | 248/346 X |
| 4,657,316 | 4/1987 | Hardt et al. | 248/923 X |
| 4,666,219 | 5/1987 | Higuchi et al. | 248/346 X |
| 4,832,419 | 5/1989 | Mitchell et al. | 248/918 X |
| 4,852,032 | 7/1989 | Matsuda et al. | 364/708 |
| 4,877,204 | 10/1989 | Gregory et al. | 248/923 X |
| 4,880,191 | 11/1989 | Lake, Jr. | 248/923 X |
| 4,980,848 | 12/1990 | Griffin et al. | 364/708 |
| 4,989,167 | 1/1991 | Kapec et al. | 364/708 |
| 5,021,922 | 6/1991 | Davis et al. | 361/380 |
| 5,083,290 | 1/1992 | Hosoi | 364/708 |

Primary Examiner—Leo P. Picard
Assistant Examiner—Michael W. Phillips
Attorney, Agent, or Firm—Konneker & Bush

[57] ABSTRACT

An AC-powerable portable computer has an upper housing in which the central processing and power supply portions of the computer operating system are disposed, and a base housing in which the hard and floppy disc drive portions of the computer operating system are disposed. The bottom side of the upper housing is connected to the top side of the base housing in a manner permitting the upper housing to be tilted forwardly and rearwardly relative to the base housing to permit a user of the computer to adjust the viewing angle of a display screen structure fixedly secured to a front side of the upper housing for pivotal movement therewith. A latch structure releasably locks the upper housing, and the screen structure fixedly secured thereto, in an upright storage and transport orientation in which the keyboard portion of the computer is removably latched over the front side of the screen structure. A position retention structure is operative to frictionally hold the upper housing in a pivotally adjusted position thereof. The overall housing and display screen arrangement of the computer, and the location of the processing and disc drive portions of the system respectively within the upper and lower housings, gives the computer a particularly compact horizontal footprint and permits the incorporation of expansion bay space within the upper housing without the usual necessity of attaching an add-on expansion module thereto.

9 Claims, 4 Drawing Sheets

COMPACT AC-POWERABLE PORTABLE COMPUTER HAVING A CPU AND EXPANSION BAY IN AN UPPER HOUSING PIVOTALLY ATTACHED TO A LOWER HOUSING

BACKGROUND OF THE INVENTION

1. Field of the Invention

The present invention relates generally to the construction and physical configuration of personal computers, and more particularly relates to the construction and physical configuration of portable, AC-powerable personal computers commonly referred to in the industry as "lunchbox" computers.

2. Description of Related Art

From an overall size and weight standpoint, portable AC-powerable personal computers occupy a niche between the larger desktop computer, designed to remain in a predetermined work space area and typically having separate processor/drive, monitor and keyboard components, and the much smaller, highly portable "notebook" computer having a combined processor/drive/keyboard structure to which a display monitor section is pivoted for tilt-up use.

In its conventional construction, an AC portable "lunchbox" computer has a main housing structure (typically provided with a top-mounted carrying handle) having a bottom side which may be rested on a table or desk surface while the computer is being used. Both the processing system and the disc drive system portions of the computer are disposed in this housing. A separate display screen housing structure is pivotally connected to the main housing, over a front side portion thereof, and a keyboard unit is removably secured to the main housing over the front side of the display screen housing.

To convert the computer from its storage and transport orientation, the keyboard unit (operatively connected to the balance of the computer by a coiled power cord) is unlatched and removed from the front side of the main housing and placed on the desk or table in front of the balance of the computer. The display screen housing is then swung upwardly and somewhat forwardly relative to the main housing to a use position in which the screen structure may be forwardly or rearwardly tilted to accommodate the computer user's viewing angle preference.

When the particular computing task is completed, the screen housing is tilted back to an upright position and then swung downwardly and inwardly back to its storage and transport position against the front side of the main housing. The keyboard unit is then re-latched to the main housing, over the front side of the screen housing, thereby returning the portable computer to its storage and transport orientation.

Despite the widespread acceptance and use of this conventional AC portable computer construction and configuration, such construction and configuration are subject to a variety of well-known problems, limitations and disadvantages. For example, the hinge mechanism used to pivotally connect the display screen housing to the main housing of the computer is of a relatively complicated articulated construction utilizing a variety of springs and cam wheels and requiring a clutch mechanism to frictionally hold the screen in its user-selected tilt orientation. This complexity, of course, undesirably increases the overall weight and fabrication cost of the computer.

The articulated hinge connection of the display screen housing to the main housing, which causes the screen housing to be moved apart from the main housing during computer use, requires the use of a flexible cable to electrically connect these two operating components of the computer. This cable, by necessity, extends between the facing sides of the two housings, and must be carefully designed and positioned to avoid being pinched between the housings when the swung-out display screen housing is moved back to its storage orientation closely against the main housing.

A cooling fan disposed within the main housing is used to cool the computer operating components therein and is also able to provide cooling to the display screen housing when it is in its inwardly pivoted storage orientation. However, when the display screen housing is swung upwardly and outwardly to its use orientation, the fan is no longer able to provide cooling to the display screen housing which then must rely on a markedly less effective natural convective cooling flow from the surrounding ambient air.

The use in this conventional portable computer configuration of separable main and display screen housings also results in housing wall redundancy since each of the two separate housings must completely enclose the computer operating components disposed therein. This, of course, undesirably adds further overall weight to the finished portable computer.

Another disadvantage of this conventional portable computer construction is that the placement in the main housing of both the processing and disc drive system portions of the computer typically completely fills the main housing, thereby leaving no room therein for expansion bays within which additional operating cards may be placed. To provide this expansion bay space typically provided in modern personal computers, it has heretofore been necessary to attach an optional auxiliary housing to the back side of the main housing. This third housing adds considerable weight to the portable computer and undesirably increases its front-to-rear depth, thus also undesirably increasing the horizontal "footprint" area which it occupies on a support surface such as a table or a desk.

It can be readily seen from the foregoing that it would be desirable to provide an AC-powerable portable computer which eliminates or at least substantially minimizes the above-mentioned problems, limitations and disadvantages heretofore associated with AC-powerable portable computers of the conventional construction generally described above. It is accordingly an object of the present invention to provide such a computer.

SUMMARY OF THE INVENTION

In carrying out principles of the present invention, in accordance with a preferred embodiment thereof, an improved AC-powerable portable computer is provided which comprises an operating and display system incorporated in a specially designed housing structure.

The housing structure includes a base housing having front and rear sides spaced apart in a first direction, a top side and a bottom side, and an upper housing having front and rear sides, a top side and a bottom side. Means are provided for interconnecting the base housing top side and the upper housing bottom side in a manner permitting the upper housing to be pivoted relative to the base housing, about a horizontal axis transverse to the aforementioned first direction, between an upright storage and transport orientation and a vertically tilted use orientation. The housing structure further includes means for releasably locking the upper housing in its storage and transport orientation, and for frictionally inhibiting pivotal movement of the upper housing away from a selected, tilted use orientation thereof.

The operating and display system of the improved computer includes a central processing subsystem disposed in the upper housing; a disc drive subsystem disposed in the base housing; a display screen structure having a front side and being fixedly secured to the upper housing, over the front side thereof, for pivotal movement with the upper housing relative to the base housing about the aforementioned horizontal axis; a keyboard; and means for removably supporting the keyboard on the housing structure in a manner such that the keyboard extends across the front side of the display screen structure.

The provision of the pivotally connected upper and base housings, and the positioning therein of the operating system as described above, permits the computer to be fabricated in a particularly compact configuration having a significantly reduced horizontal footprint compared to conventionally constructed AC portable computers. Additionally, the combination of these two features of the present invention provides the ability to build in an expansion bay area into the upper housing. This advantageously eliminates the previous necessity of attaching an optional expansion housing to the back of the computer to provide this expansion space.

The fixed securement of the screen housing to the upper housing for pivotal movement therewith eliminates the need for complicated articulated hinge mechanisms previously utilized to join the screen housing to the balance of the computer, permits an upper housing cooling fan to also cool the screen display components during computer use, and results in less housing wall redundancy, thereby desirably reducing the overall weight of the computer.

According to a feature of the present invention, the upper wall of the base housing is provided with a concave circular curvature, and the bottom wall of the upper housing is provided with a substantially identical convex circular curvature, and is pivotally connected to the concave base housing wall in a facing, closely adjacent relationship therewith.

In a preferred embodiment thereof, the aforementioned means for frictionally inhibiting include pluralities of slide block members mounted on the facing surfaces of the opposed upper and base housing walls and slidably received in elongated depressions formed in such facing surfaces. Also in a preferred embodiment thereof, the aforementioned means for releasably locking include resiliently deflectable detent members, projecting downwardly from the upper housing bottom wall, which may be snapped into appropriately positioned recesses formed in the top wall of the base housing.

DETAILED DESCRIPTION

Figure 1:
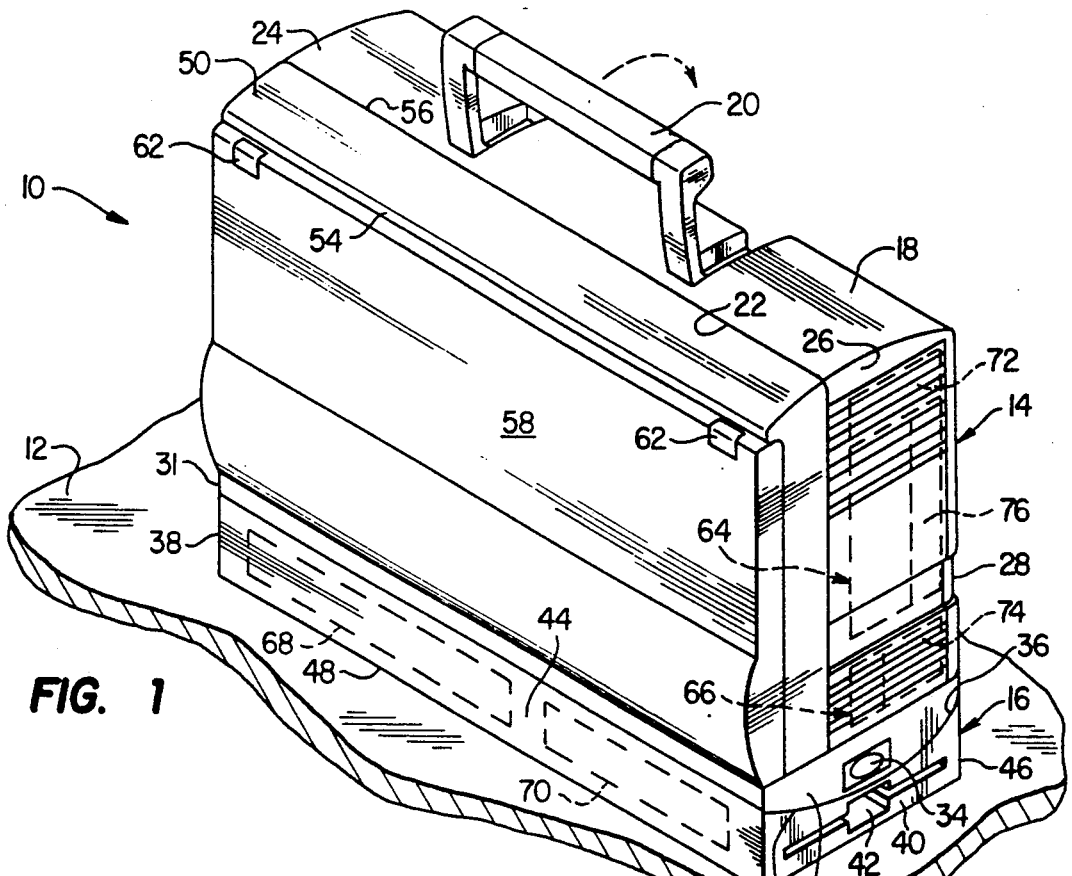
FIG. 1 is a perspective view of an AC-powerable portable computer embodying principles of the present invention, the computer being in its storage and transport orientation and supported atop a representative desk.

Perspectively illustrated in FIG. 1, in its storage and transport orientation, is a compact, AC-powerable portable computer 10 which embodies principles of the present invention and is shown resting atop a representative desk or table 12. Computer 10 includes a housing structure defined by a generally rectangular upper housing 14 and a generally rectangular base housing 16.

The upper housing 14 has a top wall 18 provided with a tilt-up carrying handle 20, an open front side 22, left and right end walls 24 and 26, a rear side wall 28, and a bottom wall 30 having a convex circular curvature. For purposes later described, the curved bottom wall 30 has a pair of upwardly extending sections 31 and 32 respectively positioned at its left and right ends and having rectangular latch buttons 34 disposed in suitable openings therein. Base housing 16 has a top wall 36 with a concave circular curvature, a left end wall 38, a right end wall 40 with a diskette insertion slot 42 formed therein, front and rear side walls 44 and 46, and a bottom wall 48.

As illustrated in FIG. 1, the radius of curvature of the upper housing bottom wall 30 is essentially equal to the radius of curvature of the base housing top wall 36, and the convexly curved wall 30 is complementarily received in the depression formed by the concavely curved wall 36.

A display housing 50, with a display screen 52 (FIG. 2) positioned on its front side 54, has an open rear side 56 which is fixedly secured to the upper housing 14 over its open front side 22. A keyboard 58, connected to the balance of the computer by the usual coiled power cord 60, is latched to the front side of the display housing 50, over the screen 52, and may be removed therefrom by pressing two latch buttons 62 on the upper edge of the keyboard.

Computer 10 is provided with an operating system, schematically depicted in phantom in FIG. 1, whose various components are uniquely disposed within the upper and base housings 14, 16 in a manner giving the computer 10 an advantageously compact configuration compared to AC-powerable portable computers having conventional housing and display screen configurations and arrangements. The operating system includes a central processing subsystem 64 and a power supply subsystem 66 positioned within the upper housing 14, and a disc drive subsystem disposed in the base housing 16 and representatively comprising a hard disc drive 68 and a floppy disc drive 70. Cooling fans 72 and 74, respectively used to cool the central processing and power supply subsystems 64 and 66, are also operatively mounted within the upper housing 14.

Due to the provision of the separate base housing 16, and the unique positioning of the disc drive subsystem therein, room becomes available in the upper housing 14 for an expansion bay area 76 (into which one or more expansion "cards" may be operatively installed if desired) incorporated in the central processing subsystem area 64. Importantly, in contrast to conventionally configured portable computers of this general type, it is not necessary to install an optional expansion bay housing on the back of the main housing structure, thereby undesirably enlarging the computer's horizontal "footprint", to provide this desirable expansion space.

The fixed mounting of the display housing 50 to the open front side 22 of the upper housing 14 advantageously permits one or both of the internally mounted fans 72, 74 to be used to cool the display operating components disposed within the housing 50. Since the display housing 50 is never moved apart from the upper housing 14 during use of the computer, this ability to fan-cool the display components is present even when the housing 50 is moved from its upright storage and transport orientation shown in FIG. 1 to a subsequently described forwardly or rearwardly tilted viewing orientation.

Additionally, since the display housing 50 is fixedly secured to the front side of the upper housing, and the facing front and rear sides of the housings 14, 50 are open, housing wall redundancy is reduced compared to conventional AC portable computers having pivotally interconnected, separable main and display housing structures. This feature of the present invention advantageously reduces the weight of the computer 10. The facing open sides of the housings 14 and 50 also facilitates the flow of fan cooling air into the display housing 50.

Figure 2:
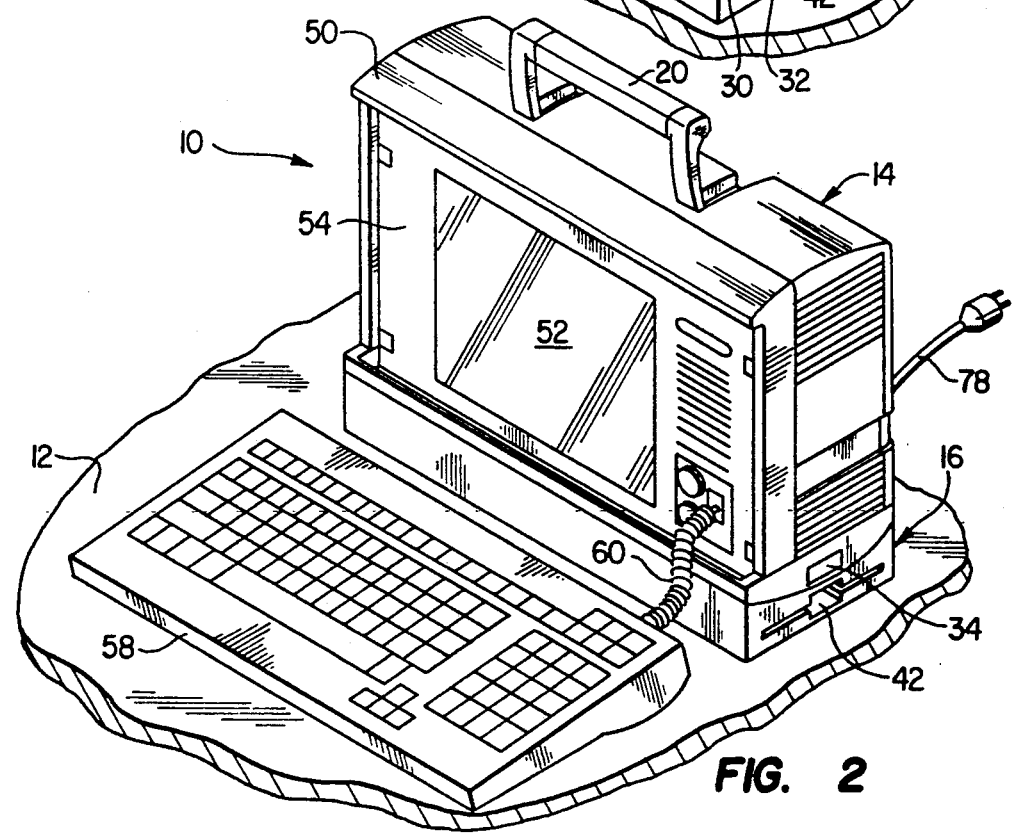
FIG. 2 is a view similar to that in FIG. 1, but with a front side-mounted keyboard portion of the computer removed and placed on the desk in front of the balance of the computer.

As previously mentioned, the computer 10 is shown in its storage and transport orientation in FIG. 1. To ready the computer for use, the keyboard 58 is unlatched from the front of the display housing 50 (by pressing the keyboard retaining latches 62) and placed on the desk or table 12 in front of the balance of the computer, as depicted in FIG. 2, and the computer's power cord 78 is plugged into the nearest electrical outlet.

The vertically facing walls 30, 36 of the upper and base housings 14, 16 are uniquely interconnected in a manner subsequently described to permit the upper housing 14 (and the display housing 50 fixedly secured thereto) to be forwardly and rearwardly tilted relative to the base housing 16 to adjust the user viewing angle of the screen 52 which is exposed when the keyboard 58 is removed as previously described. Specifically, in the illustrated computer 10, the housing 14 and screen 52 may be tilted up to 15° rearwardly (FIG. 3) from their upright storage and transport orientation shown in FIGS. 1 and 2, or up to 5° forwardly (FIG. 4).

As later described in detail, specially designed latch means are provided for releasably locking the upper housing 14 in its upright position shown in FIGS. 1 and 2. These latch means may be temporarily unlocked, to permit the rearward and forward tilting of the upper housing 14 depicted in FIGS. 3 and 4, simply by inwardly pressing the previously mentioned latch buttons 34 which form a part of the latch means. According to another subsequently described feature of the present invention, retention means are provided for releasably retaining the upper housing 14 in a selected tilted orientation thereof by frictionally resisting a pivotal movement of the upper housing back toward its upright position.

Figure 6:
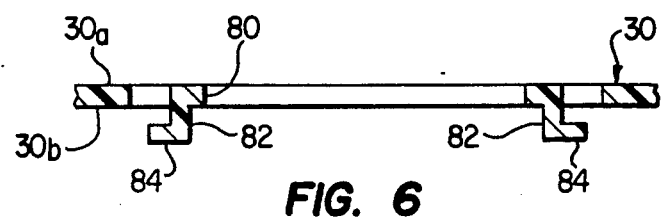
FIG. 6 is an enlarged scale partial cross-sectional view through the curved bottom wall of the upper housing taken along line 6—6 of FIG. 5.
Figure 7:
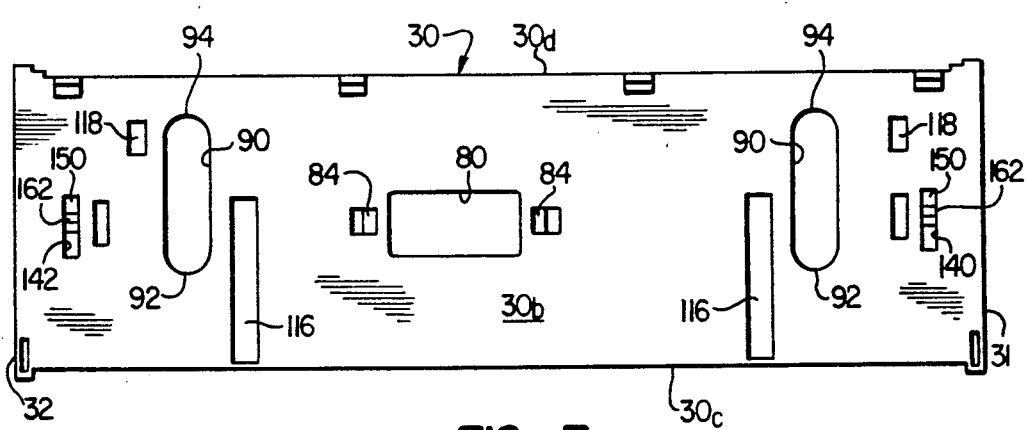
FIG. 7 is a bottom plan view of the curved bottom wall of the upper housing shown in FIG. 5.

The pivotal interconnection between the facing upper and base housing walls 30 and 36, and the previously mentioned frictionally operative retention means, will now be described with reference to FIGS. 5–7. Bottom wall 30 has a rectangular opening 80 formed centrally therethrough between a pair of generally L-shaped tabs 82 projecting downwardly from the bottom side $30_b$ of wall 30 and having bottom end portions 84 extending toward the opposite ends of the wall 30. The wall opening 80 is positioned between two spaced apart pairs 86, 88 of reinforcing ribs which project upwardly from the top side $30_a$ of wall 30 and longitudinally extend between its front and rear side edges $30_c$ and $30_d$.

Positioned between and extending parallel to each of the rib pairs 86, 88 is an elongated slot 90 formed through the wall 30 and having front and rear ends 92 and 94. As illustrated in FIGS. 5 and 7, slots 90 are offset toward the rear side edge $30_d$ of the wall 30 so that the rear ends 94 of the slots are closer to the rear wall edge $30_d$ than the front slot ends 92 are to the front wall edge $30_c$.

The top base housing wall 36 has a rectangular opening 96 formed centrally therethrough and having small rectangular extensions 98 formed centrally on its opposite ends. With the upper housing 14 in its upright orientation directly above the base housing top wall 36, these extensions underlie and are aligned with the lower end portions 84 of the downwardly projecting bottom wall tabs 82.

Spaced apart from the opposite ends of the opening 96 are a pair of internally threaded connection posts 100 which project upwardly from a laterally central portion of the top wall 36 and underlie the slots 90 in the bottom wall 30 of the upper housing. As illustrated in FIG. 5, each of the connection posts 100 has a diametrically opposite pair of longitudinally extending external rib portions 102.

In pivotally connecting the facing housing walls 30 and 36, the upper housing 14 is oriented in its upright position over the base housing 16, and the bottom tab portions 84 (FIG. 6) are lowered into the opening end extensions 98 in the base housing top wall 36. As this is done, the posts 100 upwardly enter the elongated slots 90 in the wall 30. Attachment blocks 104 are then used to captively retain the wall 30 on and above the wall 36, each of the blocks having a central opening 106 configured as shown to complementarily receive an upper end portion of one of the posts 100.

The blocks 104 are moved downwardly between the rib pairs 86, 88 (which engage opposite sides of their associated block and prevent it from rotating) and onto the upper ends of the posts 100. Mounting screws 108 are then extended downwardly through associated flat and lock washers 110,112 and tightened into the top ends of the upwardly projecting connection posts 100, thereby captively retaining wall 30 atop wall 36 and drawing wall 30 toward wall 36 with a force directly related to the degree to which the screws 108 are tightened.

Figure 3:
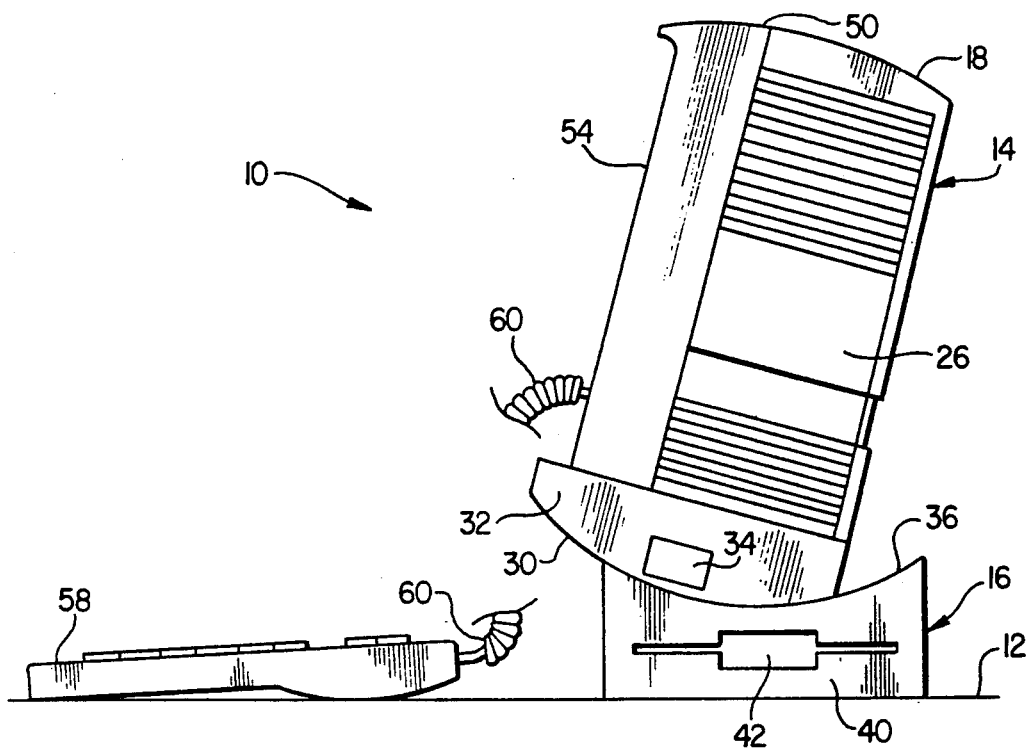
FIG. 3 is a right end view of the computer with upper housing and integral display screen portions thereof being rearwardly tilted away from their releasably locked upright position shown in FIGS. 1 and 2.
Figure 4:
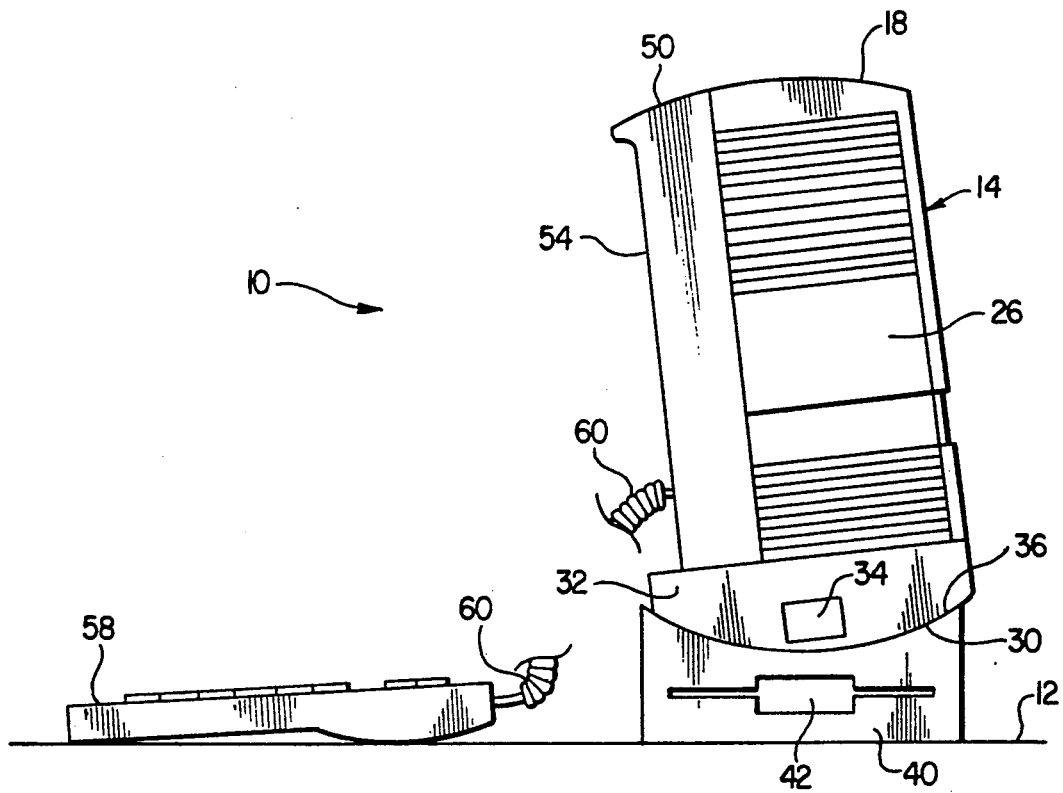
FIG. 4 is a view similar to that in FIG. 3, but with the upper housing and integral display screen portions of the computer being forwardly tilted away from their releasably locked upright position shown in FIGS. 1 and 2.

The upper housing 14, and the display housing 50 fixedly secured thereto, may then be forwardly and rearwardly pivoted relative to the base housing 16 as indicated in FIGS. 3 and 4. When the upper housing 14 reaches the rearward limit of its tilt range (FIG. 3), the rear ends 94 of the slots 90 engage the posts 100 and prevent further rearward tilting of the upper housing. In a similar fashion, when the upper housing 14 reaches the forward limit of its tilt range (FIG. 4), the front slot ends 92 engage the posts 100 to prevent further forward tilting of the upper housing. As the upper housing 14 if forwardly and rearwardly tilted, the bottom tab end portions 84 (FIGS. 5 and 7) ride along the underside of the curved base housing top wall 36.

The previously mentioned retention means, which function to frictionally and releasably retain the housings 14 and 50 in a selected tilted orientation relative to the base housing 16, include two pairs of elongated surface depressions 114,116 respectively formed in the upper and lower side surfaces of the facing walls 36,30 and extending transversely to their lengths, and two pairs of outwardly projecting slide block members 118,120 respectively mounted on the bottom side $30_b$ of wall 30 and the top side of wall 36 and slidably engaging the vertically facing side surfaces of the depression pairs 114 and 116. Blocks 118,120 are preferably of a durable plastic material and have curved outer side surfaces matched to the lateral curvatures of the facing housing walls 30 and 36.

The slide blocks 118,120 are pressed against the inner side surfaces of their associated surface depressions 114,116 by the tightening of the screws 108 to thereby frictionally resist the forward and rearward tilting of the attached housings 14 and 50 relative to the base housing 16. This frictional resistance to such tilting is assisted by the engagement between the top surface $30_a$ of the wall 30 and depending corner leg portions 122 of the attachment blocks 104 which are pressed downwardly against the top wall surface $30_a$, and slide along it as the upper housing 14 is forwardly and rearwardly tilted relative to the base housing.

With reference now to FIGS. 5 and 7-10, the previously mentioned latch means, which function to releasably hold the housings 14 and 50 in their upright storage and transport orientations relative to the base housing 16, comprise a pair of identical molded plastic latch assemblies 123,124 respectively mounted inboard of the upturned end portions 31,32 of the upper housing bottom wall 30. For purposes of illustration, the structure and operation of the latch assembly 124 will now be described.

Latch assembly 124, which is identical in both construction and operation to latch assembly 123, includes three components a frame portion 126, a latch portion 128, and a latch operating portion 130. Frame portion 126 is mounted at the juncture of the upper housing wall portions 30 and 31, over a rectangular opening 132 formed through vertical wall portions 31, and has a spaced pair of vertical side wall portions 134. Vertical walls 134 have laterally outwardly offset portions 136 downwardly through which a pair of vertical slots 138 extend.

Slots 138 are positioned adjacent the opposite ends of an elongated rectangular opening 140 extending through the housing wall 30. Positioned between the frame walls 134, to the right of the wall opening 140, are a pair of generally triangularly cross-sectioned projections 142 formed on the top side of wall 30 immediately to the right of a pair of surface depressions 144 formed therein. A generally inverted U-shaped bar portion, having an elevated top section 146, projects outwardly from lower left edge portions of the vertical walls 134.

Latch portion 128 of the illustrated latch assembly 124 has a relatively thin, hollow rectangular body with top and bottom side portions 148,150 and left and right end portions 152,154 having small alignment tab portions 156,158. A rectangularly shaped projection 160 is centrally formed on the top side of portion 150, and a detent projection 162 is formed on its lower side for purposes later described.

The latch operating portion 130 of the latch assembly 124 includes a spaced pair of vertical walls 164 extending leftwardly from the previously mentioned latch button 34 and having leftwardly and downwardly sloping front edge surfaces 166. The left or front ends of these two walls are joined to a generally U-shaped portion 168 with a leftwardly extending central section 170 with an upturned front end 172. Disposed behind the portion 130, between the walls 164, is a generally V-shaped tongue portion 174 which extends forwardly from a lower edge portion of the latch button 34. Tongue 174 is positioned between a pair of finger portions 176 having downturned rear end portions 178.

Figures 8, 10:
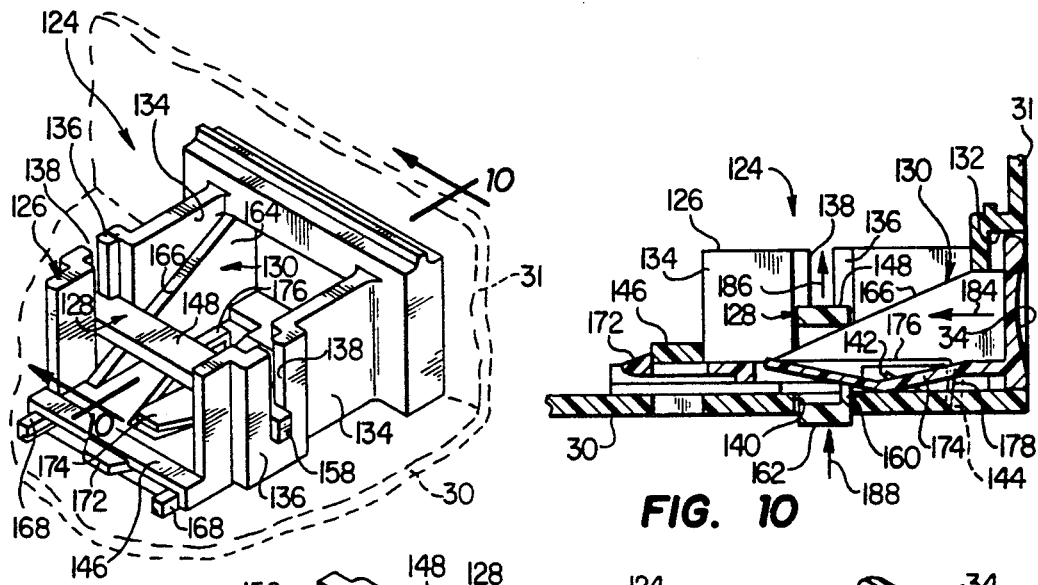
FIG. 8 is an enlarged scale, partially phantomed perspective view of the latch structure, and an adjacent housing wall portion, shown within the dashed area "8" in FIG. 5.
FIG. 10 is an enlarged scale cross-sectional view through the latch structure taken along line 10—10 of FIG. 8.
Figure 9:
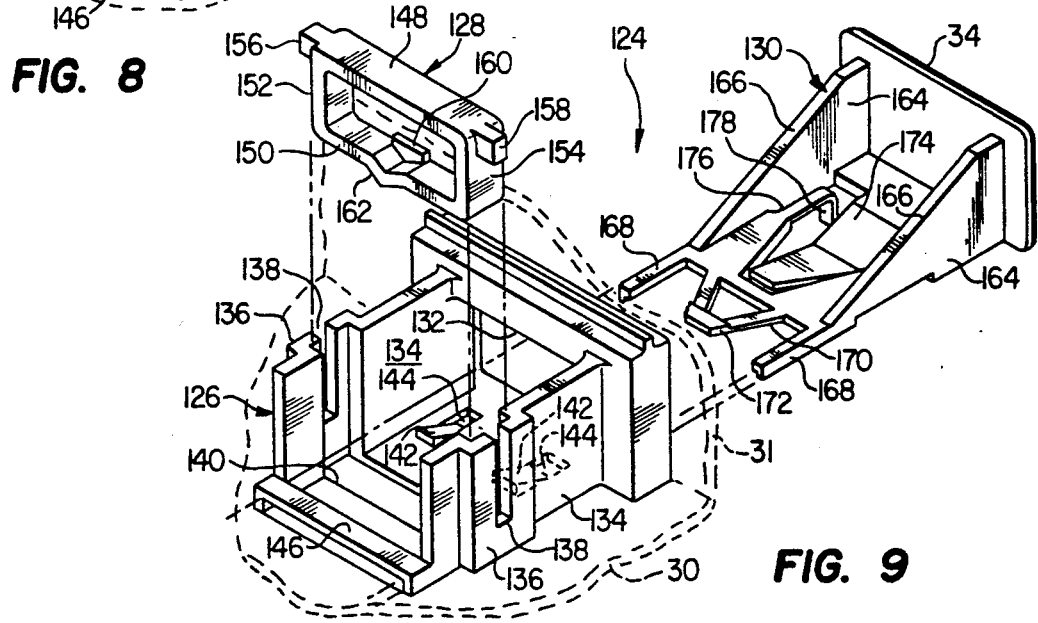
FIG. 9 is an exploded perspective view of the latch structure shown in FIG. 8.

To install the latch assembly portions 128 and 130 in the frame portion 126 (as shown in FIGS. 8 and 10), the latch portion 128 is inserted downwardly between the frame walls 134 in a manner such that the ends 152,154 of the latch portion enter the offset wall portions 136 and the latch portion end tabs 156,158 are received and moved downwardly along the vertical wall slots 138. When the tabs 156,158 bottom out in the slots 138, the lower side 150 of the latch portion 128 is received in the wall opening 140 with the detent portion 162 projecting downwardly beyond the underside of the bottom housing wall 30 as may be best seen in FIG. 10.

The front end of the latch operating portion 130 is then sequentially passed leftwardly through the vertical housing wall opening 132, through the in-place latch portion 128, and under the top section 146 of the previously mentioned bar portion. When the latch operating portion 130 is fully inserted in this manner, its upturned front end portion 172 pops up in front of the top bar section 146 (see FIGS. 8 and 10) to releasably retain the latch operation portion 130 in its illustrated installed position. Additionally, the left end portion of the tongue 176 downwardly bears on the rectangular projection 160 of latch portion 128, and the downturned finger ends 178 rearwardly engage the triangular projections 142 and extend down into the surface depressions 144 on the top side of the housing wall 30.

Figure 5:
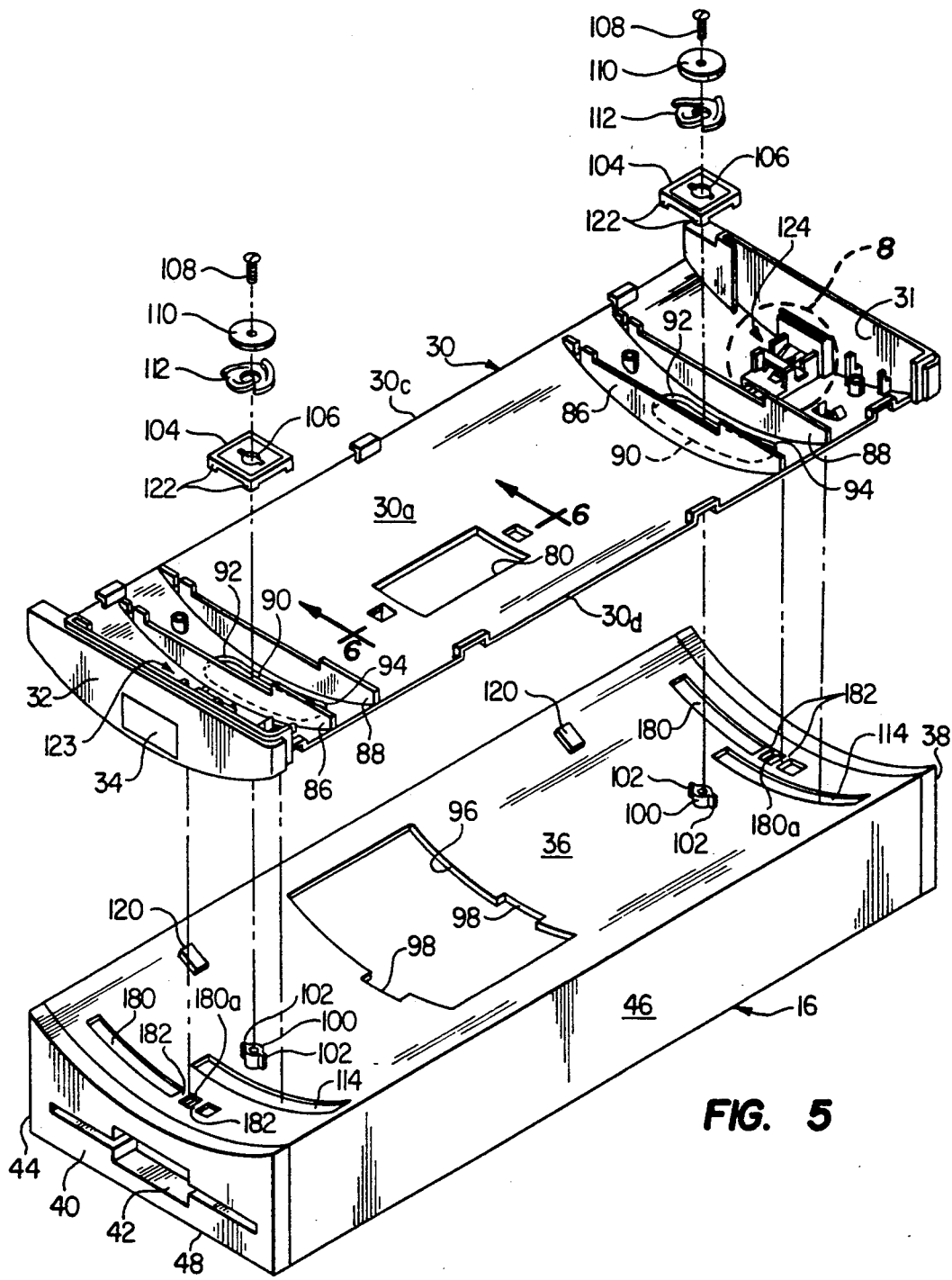
FIG. 5 is an enlarged scale exploded rear side perspective view of a lower portion of the computer including the base housing and a curved bottom wall portion of the upper housing.

Referring now to FIGS. 5 and 10, the latch assemblies 123,124 operate in conjunction with a pair of elongated surface depressions 180 formed on the upper side surface of the top base housing wall 36 (FIG. 5) and extending transversely to its length adjacent its opposite ends. When the facing housing walls 30,36 are pivotally connected as described above, the depressions 180 underlie the detent projections 162 (see FIG. 10) which depend from the underside of housing wall 30. As illustrated in FIG. 5, a longitudinally spaced pair of upwardly projecting transverse ribs 182 are formed in each of the depressions 180, with each rib pair forming therebetween a detent portion 180$_a$ of their associated surface depression 180.

When the upper housing 14 is in its upright storage and transport orientation, the downwardly projecting detent portions 162 of the latch assemblies 123,124 are downwardly received in the recess detent portions 180$_a$ which underlie them. The rib pairs 182 prevent the detents 162 from moving toward either end of their associated surface recesses 180, thereby releasably locking the upper housing 14 in its upright position shown in FIGS. 1 and 2.

Referring now to FIG. 10, to unlock the upper housing 14, and permit it to be rearwardly or forwardly pivoted to a frictionally retained tilted orientation, the two latch buttons 34 are simply pushed inwardly to lift the detents 162 out of their surface recess portions 180$_a$ and permit forward or rearward tilting of the upper housing 14. When a latch button 34 is pushed inwardly, as indicated by the arrow 184 in FIG. 10, the sloping wall edges 166 are moved leftwardly and exert an upward camming force on the top side section 148 of the latch portion 128, thereby lifting the latch portion 128 as indicated by the arrow 186.

The lifting of the latch portion 128 upwardly bends the tongue 174 and lifts the detent 162 out of its recess portion 180$_a$, as indicated by the arrow 188, thereby freeing the upper housing 14 for tilting movement relative to the underlying base housing 16. The upwardly bent tongue 174 exerts a resilient downward biasing force on the latch portion 128, thereby causing the detent 162 to bear upon and slide along the bottom side surface of its underlying surface depression 180 as the upper housing is being pivotally adjusted. When the upper housing is manually moved back to its upright position, the detent 162 is engaged by one of the ribs 182, is cammed upwardly by the rib, and then snaps back into place into its associated recess portion 180$_a$ to re-lock the upper housing.

The foregoing detailed description is to be clearly understood as being given by way of illustration and example only, the spirit and scope of the present invention being limited solely by the appended claims.

What is claimed is:

1. An AC-powerable portable computer comprising:
   a housing structure including:
      a base housing having front and rear sides spaced apart in a first direction, a concavely curved top side and a bottom side,
      a generally rectangular upper housing disposed above said base housing, in a generally vertical orientation, and having front and rear sides, a top side edge portion, and a convexly curved bottom side edge portion,
      said base housing being disposed essentially entirely within the vertical footprint of said upper housing,
      means interconnecting said base housing top side and said upper housing bottom side edge portion in a facing, circumferentially parallel and closely adjacent relationship and in a manner permitting said upper housing to be pivoted relative to said base housing, about a horizontal axis transverse to said first direction, between an upright storage and transport orientation and a vertically tilted use orientation,
   releasable locking means carried by said upper and base housings and operative to releasably lock said upper housing in said storage and transport orientation, and
   means frictionally inhibiting pivotal movement of said upper housing away from said use orientation thereof; and an operating and display system including:
      a central processing subsystem disposed in said upper housing,
      a disc drive subsystem disposed in said base housing,
      a display screen structure having a front side and being fixedly secured to said upper housing, over said front side of said upper housing, for pivotal movement with said upper housing relative to said base housing about said horizontal axis,
      a keyboard, and
      support means carried on said housing structure and operative to removably support said keyboard on said housing structure in a manner such that said keyboard extends across said front side of said display screen structure,
   said releasable locking means including cooperating interengageable latch means carried by said bottom side of said upper housing and said top side of said base housing, said latch means including:
      a frame portion carried on said bottom side of said upper housing,
      a latch portion slidably carried by said frame portion and having a detent projection,
      a latch operating portion disposed in said frame portion and resiliently biasing said latch portion toward a locking position thereof and operable to temporarily move said latch portion to a release position thereof, and
      a depression formed in said top side of said base housing and operable to receive and captively retain said detent projection when said upper housing is in said storage and transport orientation thereof and said detent projection is in said locking position thereof.

2. The AC-powerable portable computer of claim 1 wherein:
   said interconnecting means include a spaced plurality of elongated slots formed through said bottom side of said upper housing, a spaced plurality of post members extending upwardly through said elongated slots, and means connected to upper end portions of said post members and precluding upward removal of said bottom side of said upper housing from said top side of said base housing.

3. The AC-powerable portable computer of claim 2 wherein:
   said post members cooperate with said elongated slots to preclude pivotal movement of said upper housing relative to said base housing beyond predetermined forward and rearward tilt stop positions for said upper housing.

4. The AC-powerable portable computer of claim 1 wherein said frictionally inhibiting means include:
   an outer side surface depression formed in one of said facing top and bottom sides, and a frictional retention member projecting outwardly from the other of said facing top and bottom sides and slidably received in said outer side surface depression.

5. An AC-powerable computer comprising:

a housing structure including:

a base housing having front and rear sides spaced apart in a first direction, a bottom side, and a top wall having a circular concave curvature, an upper housing disposed above said base housing in a generally vertical orientation and having front and rear sides, a top side, and a bottom wall having a circular convex curvature, said bottom wall of said upper housing being in a facing, closely adjacent, circumferentially parallel relationship with said top wall of said base housing, said base housing being disposed essentially entirely within the vertical footprint of said upper housing, means interconnecting said base housing top wall and said upper housing bottom side in a manner permitting said upper housing to be pivoted relative to said base housing, about a horizontal axis transverse to said first direction, between an upright storage and transport orientation and a vertically tilted use orientation, said interconnecting means including a spaced plurality of elongated slots formed through said bottom wall of said upper housing, a spaced plurality of post members extending upwardly through said elongated slots, and means connected to upper end portions of said post member and precluding upward removal of said bottom wall of said upper housing from said top wall of said base housing, said post members cooperating with said elongated slots to preclude pivotal movement of said upper housing relative to said base housing beyond predetermined forward and rearward tilt stop positions for said upper housing, releasable locking means carried by said upper and base housings and operative to releasably lock said upper housing in said storage and transport orientation thereof, said releasable locking means including cooperating interengageable latch means carried by said bottom wall of said upper housing and said top wall of said base housing and including a frame portion carried on said bottom wall of said upper housing, a latch portion slidably carried by said frame portion and having a detent projection, a latch operating portion disposed in said frame portion and resiliently biasing said latch portion toward a locking position thereof and operable to temporarily move said latch portion to a release position thereof, and a depression formed in said top wall of said base housing and operative to receive and captively retain said detent projection when said upper housing is in said storage and transport orientation thereof and said detent projection is in said locking position thereof, and means frictionally inhibiting pivotal movement of said upper housing away from said use orientation thereof; and a display screen structure fixedly secured to said front side of said upper housing for pivotal movement with said upper housing relative to said base housing.

6. The AC-powerable portable computer of claim 5 wherein said frictionally inhibiting means include:

an outer side surface depression formed in one of said facing top and bottom walls, and a frictional retention member projecting outwardly from the other of said facing top and bottom walls and slidably received in said outer side surface depression.

7. The AC-powerable portable computer of claim 5 further comprising an operating system including:

a central processing subsystem disposed in said upper housing, and a disc drive subsystem disposed in said base housing.

8. An AC-powerable portable computer comprising:

an operating system having first and second subsystems and a display screen structure;

a base housing having a front side portion and a concavely curved top wall, said first subsystem being disposed within said upper housing;

an upper housing having a convexly curved bottom wall disposed in a facing, circumferentially parallel relationship with said concavely curved top wall of said base housing, said second subsystem being disposed within said upper housing;

means for pivotally interconnecting said facing top and bottom walls in a manner permitting said upper housing to be forwardly and rearwardly tilted relative to said base housing;

means for fixedly securing said display screen to said upper housing for tilting therewith relative to said base housing; and an expansion bay disposed within said upper housing.

9. The AC-powerable computer of claim 5 wherein:
said upper housing has an expansion bay disposed therein.

* * * * *